（12）United States Patent
Shinde et al.

(10) Patent No.: US 11,396,067 B2
(45) Date of Patent: Jul. 26, 2022

(54) SHUTTLE VALVE WITH A CASING ASSEMBLY

(71) Applicant: The Boeing Company, Chicago, IL (US)

(72) Inventors: Jagdish Shinde, Bangalore (IN);
Yathish Belakavadi, Bangalore (IN)

(73) Assignee: The Boeing Company, Chicago, IL (US)

( * ) Notice: Subject to any disclaimer, the term of this patent is extended or adjusted under 35 U.S.C. 154(b) by 63 days.

(21) Appl. No.: 16/874,482

(22) Filed: May 14, 2020

(65) Prior Publication Data

US 2021/0354255 A1    Nov. 18, 2021

(51) Int. Cl.
  *F16K 11/076*    (2006.01)
  *B23P 15/00*    (2006.01)
  *F16K 11/044*    (2006.01)

(52) U.S. Cl.
  CPC .......... *B23P 15/001* (2013.01); *F16K 11/044* (2013.01); *F16K 11/076* (2013.01)

(58) Field of Classification Search
  CPC ..... F16K 11/044; F16K 11/076; B23P 15/001
  See application file for complete search history.

(56) References Cited

U.S. PATENT DOCUMENTS

| 2,569,967 | A | * | 10/1951 | Ashton | F16K 17/26 137/113 |
| 2,821,972 | A | * | 2/1958 | Banker | F02M 37/0088 123/434 |
| 3,008,482 | A | * | 11/1961 | Hunter | F16K 11/056 137/113 |
| 3,533,431 | A | * | 10/1970 | Kuenzel | F16K 11/044 137/113 |
| 9,371,913 | B2 | * | 6/2016 | Lhymn | F16K 1/304 |
| 10,007,281 | B2 | * | 6/2018 | Qiu | F16K 31/002 |
| 10,012,318 | B2 | * | 7/2018 | Morgan | F16K 11/044 |
| 10,190,696 | B2 | * | 1/2019 | Summers | F16K 11/056 |
| 11,098,805 | B1 | * | 8/2021 | Chandrashekar | F16K 11/044 |

* cited by examiner

*Primary Examiner* — Michael R Reid
(74) *Attorney, Agent, or Firm* — Duft & Bornsen, PC (57) ABSTRACT

A shuttle valve and a method of fabricating a shuttle valve. In one embodiment, a shuttle valve comprises a casing assembly, a sleeve, and a spool slidable within the sleeve. The casing assembly includes an inlet casing having first and second inlet ports, an inlet casing coupling port, and an inlet fluid passageway providing fluid communication between the first inlet port, the second inlet port, and the inlet casing coupling port. The casing assembly further includes an outlet casing having an outlet port, an outlet casing coupling port, and an outlet fluid passageway providing fluid communication between the outlet port and the outlet casing coupling port. The outlet casing coupling port is removably coupled to the inlet casing coupling port. The sleeve is disposed in the inlet fluid passageway of the inlet casing.

20 Claims, 11 Drawing Sheets

SHUTTLE VALVE WITH A CASING ASSEMBLY

FIELD

This disclosure relates to the field of valves, and more particularly, to shuttle valves.

BACKGROUND

Fluid power systems, such as pneumatic or hydraulic systems, commonly use valves to regulate or control the flow of fluid. In certain types of fluid power systems, the supply of fluid to a subsystem is from more than one source to meet system requirements. Thus, a shuttle valve may be implemented, which allows fluid to flow through it from one of two sources. A general shuttle valve includes a primary inlet port, a secondary inlet port, an outlet port, and a sliding part between the inlet ports, which is referred to as a spool or shuttle. A pressure differential between the inlet ports causes the spool to move, and allows flow from one of the inlet ports while blocking flow from the other. For instance, a higher pressure at the primary inlet port causes the spool to seat against the secondary inlet port, which seals off the secondary inlet port and allows fluid to flow from the primary inlet port and out the outlet port. A higher pressure at the secondary inlet port causes the spool to seat against the primary inlet port, which seals off the primary inlet port and allows fluid to flow from the secondary inlet port and out the outlet port.

Due to the variety of uses of shuttle valves, it is beneficial to continue to design improved shuttle valves.

SUMMARY

Described herein is a shuttle valve that has a casing assembly. Whereas a typical shuttle valve has a unitary casing, the casing assembly as described herein is split between an inlet casing and an outlet casing. The inlet casing includes inlet ports that are coaxial, and the outlet casing includes an outlet port. The outlet casing is coupled to the inlet casing to form the casing assembly. A sliding part is disposed between the inlet ports in the form of a spool that is slidable within a sleeve. One technical benefit of implementing a casing assembly is that the inlet casing and the outlet casing can be manufactured or machined separately. For example, cylindrical bores may be formed in the inlet casing and the outlet casing for fluid passageways. Because the inlet and outlet casings are separate components, the cylindrical bores may be formed in a more effective and strategic manner. This may avoid scenarios where one or more plugs are needed in the casing to cap the end of a cylindrical bore. Another benefit is that the design of the shuttle valve has fewer parts than other shuttle valves, and is less likely to leak or fail.

One embodiment comprises a shuttle valve comprising a casing assembly that includes an inlet casing having a first inlet port, a second inlet port coaxial with the first inlet port, an inlet casing coupling port, and an inlet fluid passageway providing fluid communication between the first inlet port, the second inlet port, and the inlet casing coupling port. The casing assembly further includes an outlet casing having an outlet port, an outlet casing coupling port, and an outlet fluid passageway providing fluid communication between the outlet port and the outlet casing coupling port. The outlet casing coupling port is removably coupled to the inlet casing coupling port. The shuttle valve further comprises a sleeve disposed in the inlet fluid passageway of the inlet casing, and a spool slidable within the sleeve.

In another embodiment, the shuttle valve further comprises a strainer. The inlet casing coupling port includes a cylindrical recess, and the strainer is disposed in the cylindrical recess. The outlet casing coupling port includes a cylindrical member fitted in the cylindrical recess to abut the strainer.

In another embodiment, the cylindrical member includes a seal groove, and a seal member is disposed in the seal groove to provide a seal between the outlet casing coupling port and the inlet casing coupling port.

In another embodiment, the inlet casing includes a longitudinal bore centered on an axial line, and having a first bore segment of a first diameter, and a second bore segment of a second diameter that is larger than the first diameter. A transition portion between the first bore segment and the second bore segment forms an interface surface. The first bore segment is disposed between the first inlet port and the interface surface, and the second bore segment is disposed between the second inlet port and the interface surface.

In another embodiment, the shuttle valve further comprises a hose adapter having a hose fitting at a first end, a cylindrical member at a second end that fits within the second bore segment of the inlet casing, an inlet port coupling between the hose fitting and the cylindrical member that couples with the second inlet port, and a longitudinal bore centered on the axial line.

In another embodiment, the sleeve is interposed between the interface surface of the inlet casing and the second end of the hose adapter.

In another embodiment, the inlet casing includes a hose fitting integrated at the first inlet port, and the outlet casing includes a hose fitting integrated at the outlet port.

In another embodiment, the sleeve includes a cylindrical body having an outer peripheral surface, and a spool bore disposed longitudinally within which the spool is slidable. The sleeve further includes flanges on the outer peripheral surface at opposing ends of the cylindrical body, and a spring retainer groove on the outer peripheral surface at a middle region of the cylindrical body that includes ball apertures. The cylindrical body is perforated with fluid apertures between the spring retainer groove and each of the flanges.

In another embodiment, the shuttle valve further comprises a detent mechanism that includes a spring having a C-shaped body with open ends, and further having ball retaining holes toward the ends. The detent mechanism further includes detent balls disposed between the ball retaining holes of the spring and the ball apertures of the spring retainer groove.

In another embodiment, the spool comprises a spherical ball.

In another embodiment, the sleeve further includes a seal groove disposed around the spool bore at each of the ends of the cylindrical body, and a seal member fitted in the seal groove.

Another embodiment comprises a shuttle valve comprising an inlet casing and an outlet casing assembled to form a casing assembly. The inlet casing includes a first inlet port, a second inlet port coaxial with the first inlet port, and a longitudinal bore between the first inlet port and the second inlet port. The outlet casing includes an outlet port. The shuttle valve further comprises a sleeve disposed in the longitudinal bore, and a spool comprising a spherical ball slidable within the sleeve between a first operating position that blocks the second inlet port, and a second operating position that blocks the first inlet port.

In another embodiment, the inlet casing includes an inlet casing coupling port comprising a cylindrical recess, and the outlet casing includes an outlet casing coupling port comprising a cylindrical member fitted in the cylindrical recess.

In another embodiment, the inlet casing includes a hose fitting integrated at the first inlet port, and the outlet casing includes a hose fitting integrated at the outlet port.

In another embodiment, the shuttle valve further comprises a hose adapter having a hose fitting at a first end, a cylindrical member at a second end that fits within the longitudinal bore of the inlet casing, an inlet port coupling between the hose fitting at the first end of the hose adapter and the cylindrical member that couples with the second inlet port, and a longitudinal bore coaxial with the longitudinal bore of the inlet casing.

Another embodiment comprises a method of fabricating a shuttle valve. The method comprises providing an inlet casing having a first inlet port, a second inlet port coaxial with the first inlet port, an inlet casing coupling port, and an inlet fluid passageway providing fluid communication between the first inlet port, the second inlet port, and the inlet casing coupling port. The method further comprises providing an outlet casing having an outlet port, an outlet casing coupling port, and an outlet fluid passageway providing fluid communication between the outlet port and the outlet casing coupling port. The method further comprises coupling the outlet casing coupling port of the outlet casing to the inlet casing coupling port of the inlet casing to form a casing assembly, providing a sleeve having a spool bore and a spool slidable within the spool bore, inserting the sleeve into the inlet fluid passageway of the inlet casing through the second inlet port, and attaching a hose adapter to the second inlet port.

In another embodiment, providing the inlet casing further comprises providing the inlet casing having a hose fitting integrated at the first inlet port, and providing the outlet casing further comprises providing the outlet casing having a hose fitting integrated at the outlet port.

In another embodiment, the method further comprises inserting a strainer at the inlet casing coupling port of the inlet casing.

In another embodiment, providing a sleeve having a spool bore and a spool slidable within the spool bore comprises providing a spherical ball slidable within the spool bore.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
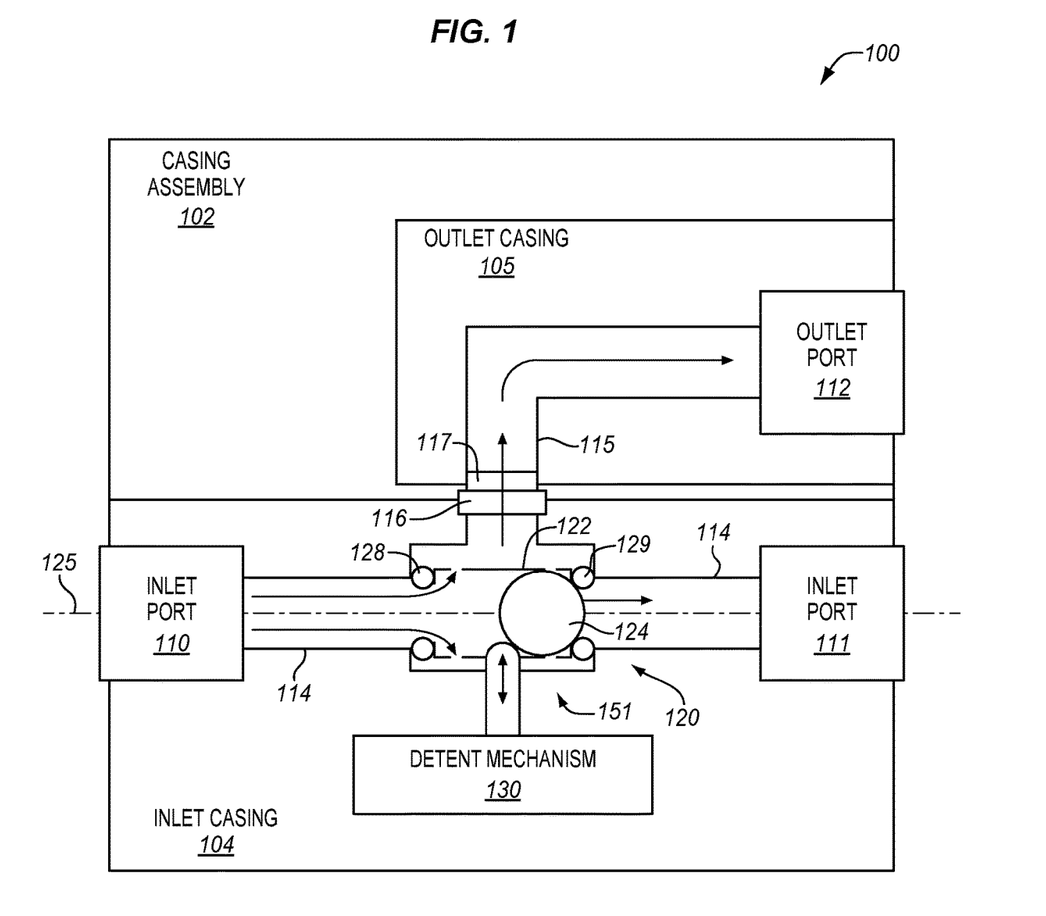
FIGS. 1-2 are schematic diagrams of a shuttle valve in an illustrative embodiment.
Figure 2:
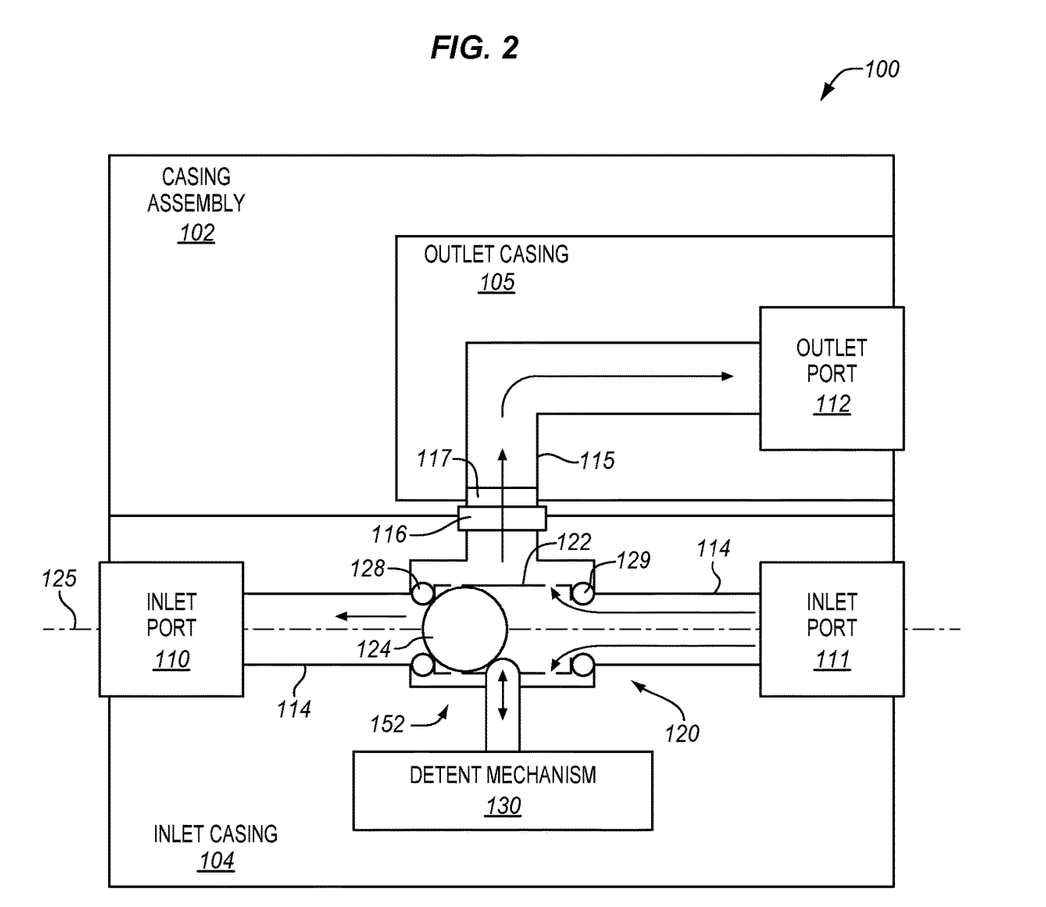

FIGS. 1-2 are schematic diagrams of a shuttle valve 100 in an illustrative embodiment. Shuttle valve 100 includes a casing assembly 102 that houses the internal components of shuttle valve 100. Casing assembly 102 is comprised of an inlet casing 104 and an outlet casing 105 that are fitted or coupled together. Inlet casing 104 and outlet casing 105 are cast, manufactured, or otherwise formed as separate or distinct parts that are assembled together to form casing assembly 102. Inlet casing 104 includes inlet ports 110-111 that are aligned coaxially on an axial line 125, and an inlet casing coupling port 116. Inlet casing coupling port 116 may be disposed generally transverse to inlet ports 110-111 as illustrated in FIG. 1, but may have other orientations in other embodiments. Inlet casing 104 further includes an inlet fluid passageway 114 that provides fluid communication between inlet port 110, inlet port 111, and inlet casing coupling port 116. Outlet casing 105 includes outlet port 112, an outlet casing coupling port 117, and an outlet fluid passageway 115 that provides fluid communication between outlet port 112 and outlet casing coupling port 117.

When casing assembly 102 is assembled, outlet casing coupling port 117 is removably attached, connected, or coupled to inlet casing coupling port 116. For example, outlet casing coupling port 117 may be pressed or fitted into inlet casing coupling port 116, may be threaded into inlet casing coupling port 116, or otherwise mated to inlet casing coupling port 116 to provide a fluid coupling between inlet casing 104 and outlet casing 105.

Shuttle valve 100 further includes a removable shuttle cartridge 120 that is inserted or disposed in inlet fluid passageway 114 between inlet port 110 and inlet port 111. Shuttle cartridge 120 includes a sleeve 122 and a spool 124 disposed within sleeve 122. Sleeve 122 is generally a hollow, cylindrical member centered on axial line 125. Spool 124 (also referred to as a shuttle) represents the slidable part of shuttle valve 100, which is slidable within sleeve 122 along axial line 125 (also referred to as the "sliding axis" for spool 124). In this embodiment, shuttle valve 100 is a "biased" shuttle valve that incorporates a detent mechanism 130 to hold spool 124 at a first operating position 151 (see FIG. 1) or a second operating position 152 (see FIG. 2).

Shuttle valve 100 allows for a flow of fluid from inlet port 110 to outlet port 112, or from inlet port 111 to outlet port 112 depending on the operating position 151/152 of spool 124. Spool 124 slides within sleeve 122 based on a pressure differential between inlet ports 110-111. When the inlet pressure at inlet port 110 is greater than the inlet pressure at inlet port 111, spool 124 shifts to the right along axial line 125 (as indicated by the arrow in FIG. 1) to operating position 151 where spool 124 is seated against spool seat 129. At operating position 151, inlet port 111 is blocked and fluid is allowed to flow from inlet port 110 to outlet port 112. When the inlet pressure at inlet port 111 is greater than the inlet pressure at inlet port 110, spool 124 shifts to the left along axial line 125 (as indicated by the arrow in FIG. 2) to operating position 152 where spool 124 is seated against spool seat 128. At operating position 152, inlet port 110 is blocked and fluid is allowed to flow from inlet port 111 to outlet port 112.

Figure 3:
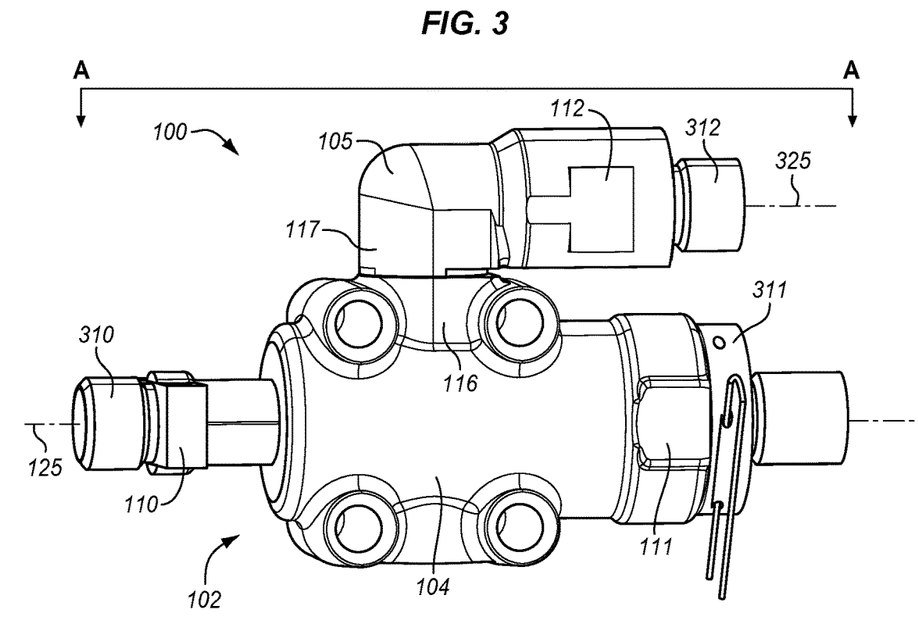
FIG. 3 is a perspective view of a shuttle valve in an illustrative embodiment.

The following provides a structural example of shuttle valve 100. FIG. 3 is a perspective view of shuttle valve 100 in an illustrative embodiment. As above, shuttle valve 100 includes a casing assembly 102 comprised of an inlet casing 104 mated or otherwise coupled to outlet casing 105 via inlet casing coupling port 116 and outlet casing coupling port 117. Inlet casing 104 includes inlet ports 110-111 that are coaxial and centered on axial line 125. In this embodiment, inlet casing 104 includes a hose fitting 310 integrated at inlet port 110, which means that hose fitting 310 is formed unitarily, monolithically, or integrally at inlet port 110. Hose fitting 310 is configured to connect to a hose pipe or the like, such as in a hydraulic circuit, a pneumatic circuit, etc. A hose adapter 311 is connected or coupled at inlet port 111, which will be described in more detail below.

Outlet casing 105 includes outlet port 112. In this embodiment, outlet casing 105 includes a hose fitting 312 integrated at outlet port 112. Further in this embodiment, outlet port 112 is centered on an axial line 325 that is parallel with axial line 125. In other embodiments, axial line 325 may be perpendicular with axial line 125, or may be angled with respect to axial line 125.

Figure 4:
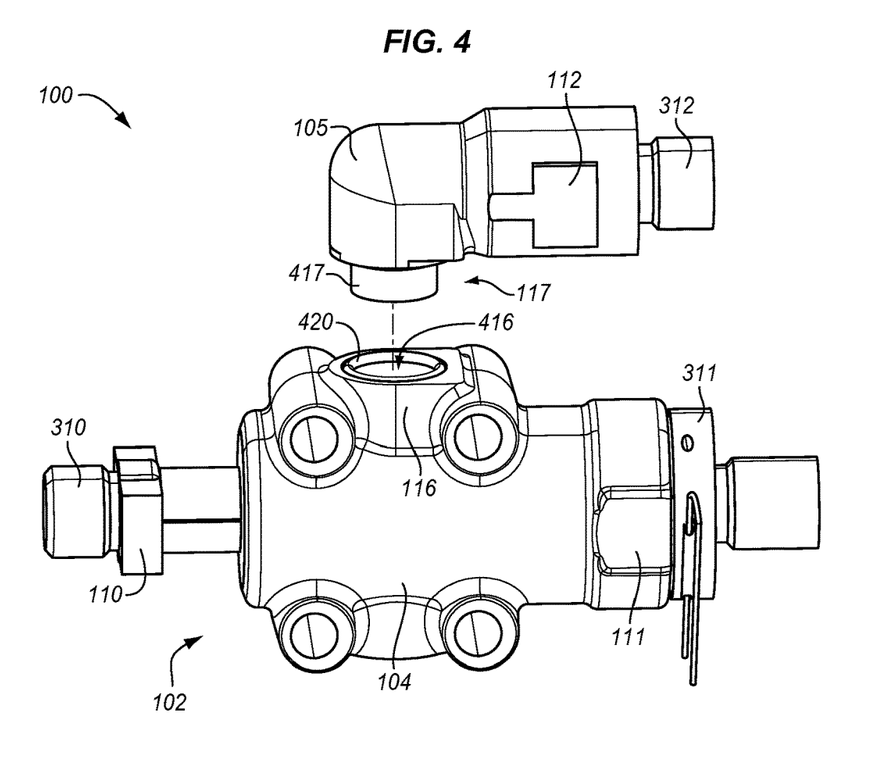
FIG. 4 is another perspective view of a shuttle valve with an outlet casing disassembled from an inlet casing in an illustrative embodiment.

FIG. 4 is another perspective view of shuttle valve 100 with outlet casing 105 disassembled from inlet casing 104 in an illustrative embodiment. Inlet casing coupling port 116 of inlet casing 104 includes a cylindrical recess 416, and outlet casing coupling port 117 includes a cylindrical member 417 that fits within cylindrical recess 416. When cylindrical member 417 is fitted, pressed, or otherwise mated with cylindrical recess 416, outlet casing 105 is coupled to inlet casing 104. Also shown is a seal member 420 that provides a seal between outlet casing 105 and inlet casing 104, such an O-ring, an annular gasket, or the like.

Figure 5:
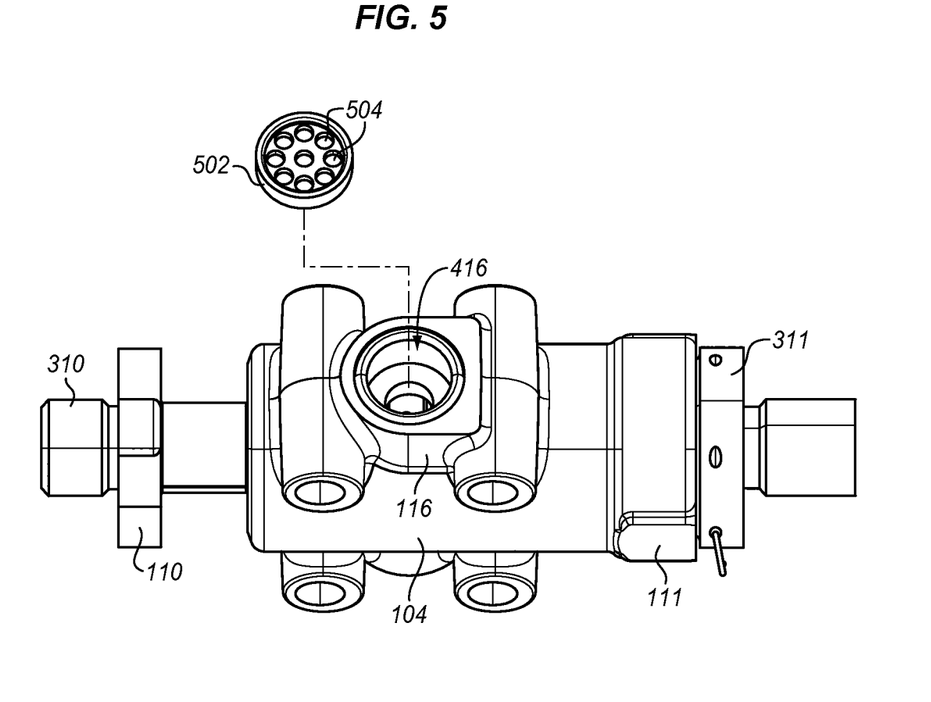
FIG. 5 is a perspective view of a top portion of an inlet casing in an illustrative embodiment.

In one embodiment, a strainer or filter may be disposed in cylindrical recess 416 of inlet casing 104. FIG. 5 is a perspective view of a top portion of inlet casing 104 in an illustrative embodiment. A strainer 502 is a component that retains or blocks debris while allowing a liquid to pass. In this embodiment, strainer 502 is cylindrically shaped to fit within cylindrical recess 416 of inlet casing 104, and includes a plurality of filter holes 504. One technical benefit of incorporating strainer 502 is to remove debris (e.g., Foreign Object Debris (FOD)) in the fluid path between inlet casing 104 and outlet casing 105.

Figure 6:
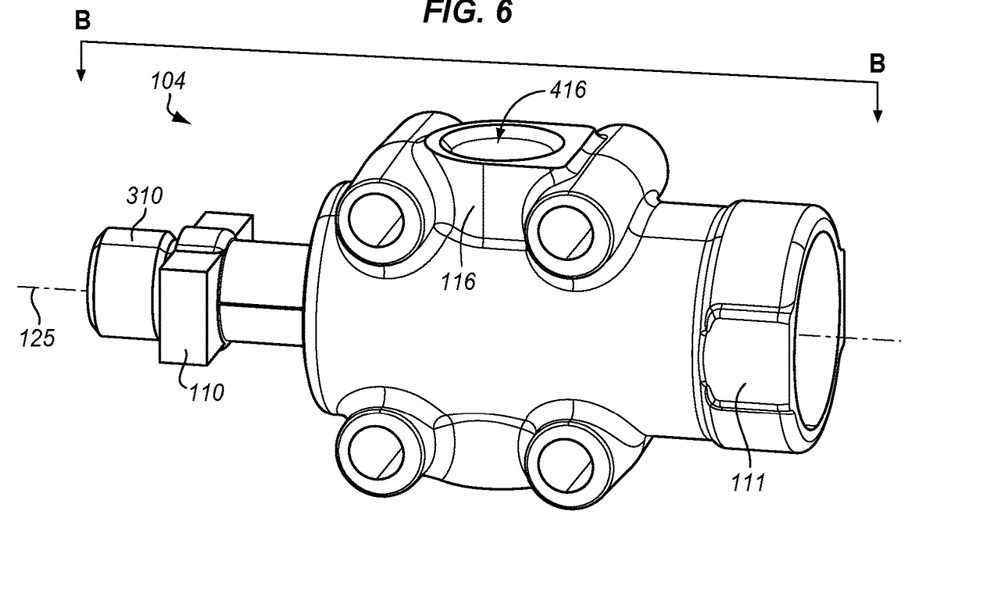
FIG. 6 is a perspective view of an inlet casing in an illustrative embodiment.
Figure 7:
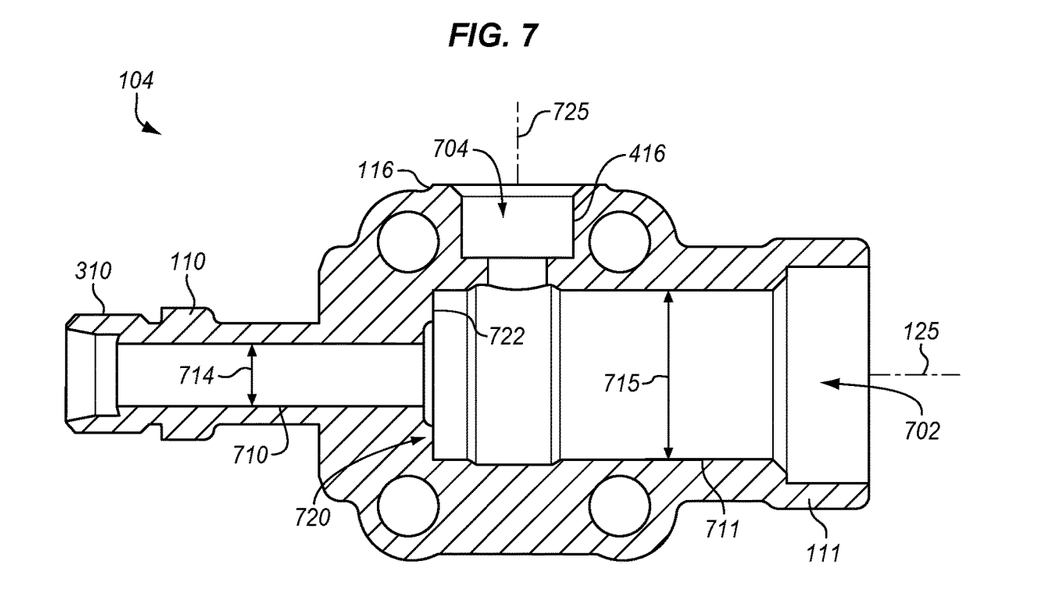
FIG. 7 is a cross-sectional view of an inlet casing in an illustrative embodiment.

FIG. 6 is a perspective view of inlet casing 104, and FIG. 7 is a cross-sectional view of inlet casing 104 in an illustrative embodiment. The view in FIG. 7 is across cut-line B-B in FIG. 6. Inlet casing 104 is made from a rigid material. For example, inlet casing 104 may be cast from metal, molded or otherwise formed from plastic, or formed from another material. Inlet casing 104 includes inlet ports 110-111 that are coaxial and centered on axial line 125, and a hose fitting 310 integrated at inlet port 110. Inlet casing 104 also includes inlet casing coupling port 116 having cylindrical recess 416 configured to mate with a cylindrical member 417 of outlet casing 105 (see also, FIG. 4). In FIG. 7, inlet casing 104 includes cylindrical bores or cylindrical channels that define the inlet fluid passageway 114 between inlet ports 110-111 and inlet casing coupling port 116 (see also, FIG. 1). More particularly, inlet casing 104 includes a longitudinal bore 702 centered on axial line 125, and a transverse bore 704 centered on an axial line 725 that is transverse to axial line 125. Longitudinal bore 702 forms a fluid path between inlet ports 110-111 where the valve functionality is implemented in the form of sleeve 122 and spool 124. In this embodiment, longitudinal bore 702 that has different-diameter bore segments. For example, one bore segment 710 has a diameter 714, and another bore segment 711 has a diameter 715 that is larger than diameter 714. A transition portion 720 between bore segments 710-711 forms or defines an interface surface 722 for sleeve 122 that faces inlet port 111. Bore segment 710 is disposed between inlet port 110 and interface surface 722, and bore segment 711 is disposed between inlet port 111 and interface surface 722. Transverse bore 704 intersects longitudinal bore 702 at bore segment 711, and forms a fluid path between longitudinal bore 702 and outlet casing 105 when assembled. The cylindrical recess 416 of inlet casing coupling port 116 is formed coaxial with transverse bore 704 on axial line 725.

Figure 8:
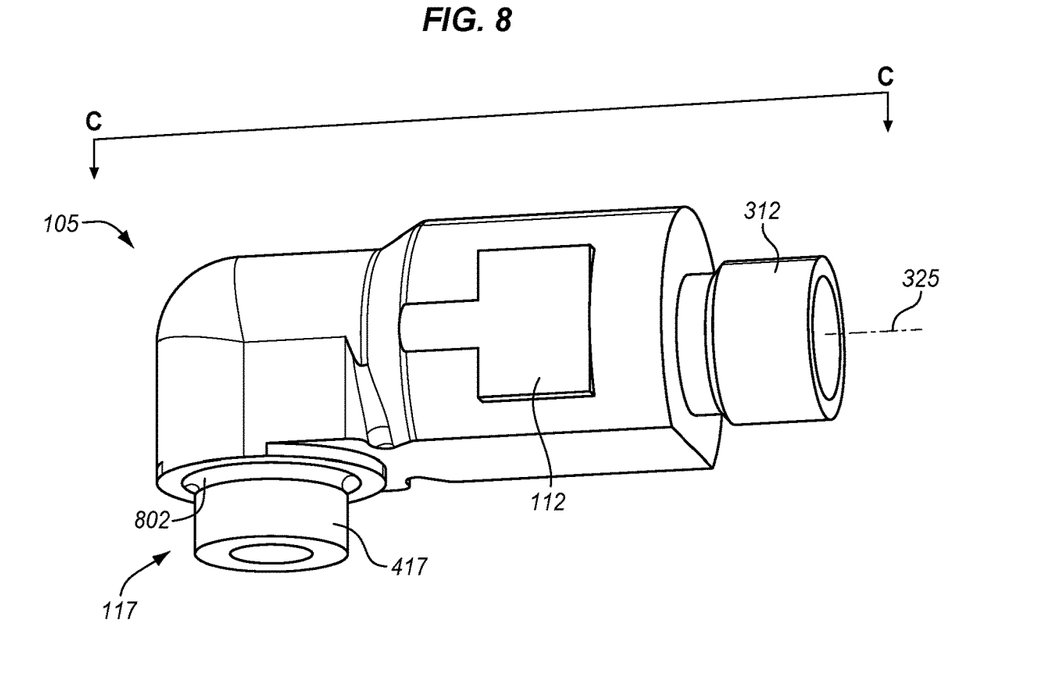
FIG. 8 is a perspective view of an outlet casing in an illustrative embodiment.
Figure 9:
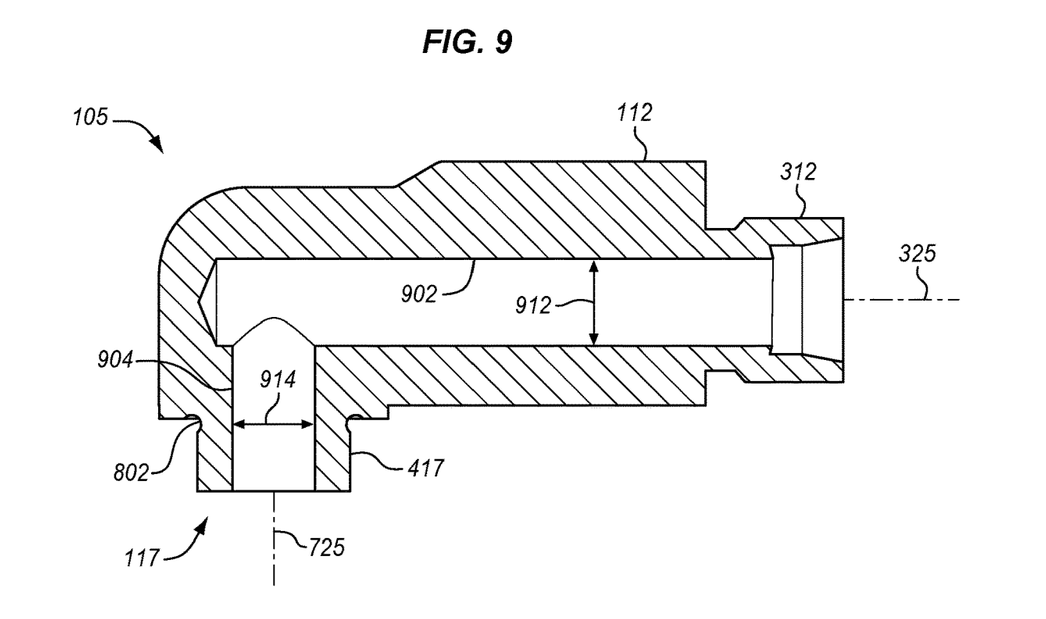
FIG. 9 is a cross-sectional view of an outlet casing in an illustrative embodiment.

FIG. 8 is a perspective view of outlet casing 105, and FIG. 9 is a cross-sectional view of outlet casing 105 in an illustrative embodiment. The view in FIG. 9 is across cut-line C-C in FIG. 8. Outlet casing 105 is made from a rigid material. For example, outlet casing 105 may be cast from metal, molded or otherwise formed from plastic, or formed from another material in a similar manner to inlet casing 104. Outlet casing 105 includes outlet port 112 centered on axial line 325, and a hose fitting 312 integrated at outlet port 112. Outlet casing 105 also includes outlet casing coupling port 117 having cylindrical member 417 configured to mate with cylindrical recess 416 of inlet casing 104 (see also, FIG. 4). In one embodiment, cylindrical member 417 includes a seal groove 802 configured to receive seal member 420 (see FIG. 4) or the like. This has the benefit of providing a seal between outlet casing coupling port 117 and inlet casing coupling port 116. In FIG. 9, outlet casing 105 includes cylindrical bores or cylindrical channels that define the outlet fluid passageway 115 between outlet casing coupling port 117 and outlet port 112 (see also, FIG. 1). More particularly, outlet casing 105 includes a longitudinal bore 902 centered on axial line 325, and a transverse bore 904 centered on axial line 725 that is transverse to axial line 325. Longitudinal bore 902 forms a fluid path between outlet port 112 and transverse bore 904, and has a diameter 912. The diameter 912 of longitudinal bore 902 may be substantially similar to the diameter 714 of bore segment 710 of inlet casing 104. Transverse bore 904 intersects longitudinal bore 902, and forms a fluid path between longitudinal bore 902 and inlet casing 104 when assembled. Transverse bore 904 has a diameter 914, which may be substantially similar to the diameter 912 of longitudinal bore 902. The cylindrical member 417 of outlet casing coupling port 117 is formed coaxial with transverse bore 904 on axial line 725.

Providing shuttle valve 100 with a casing assembly 102 as described above has technical benefits over a unitary casing of other types of shuttle valves. Looking at FIG. 7, longitudinal bore 702 and transverse bore 704 of inlet casing 104 may be easily machined with a drill or another type of boring tool. For example, the boring tool may form longitudinal bore 702 from the right and/or left sides of inlet casing 104, and may form transverse bore 704 from the top of inlet casing 104 in FIG. 7. Also, longitudinal bore 902 and transverse bore 904 of outlet casing 105 may be easily machined in another fabrication step with a drill or another type of boring tool (see FIG. 9). For example, the boring tool may form longitudinal bore 902 from the right side of outlet casing 105, and may form transverse bore 904 from the bottom of outlet casing 105 in FIG. 9. With a unitary casing as in some prior shuttle valves, one or more bores are formed by drilling through the exterior of the unitary casing, and a plug is inserted in the exterior hole. With the casing assembly 102 as described above, plugs such as this are not needed, which reduces the number of parts for shuttle valve 100 and reduces the chance of leaks or other problems.

Figure 10:
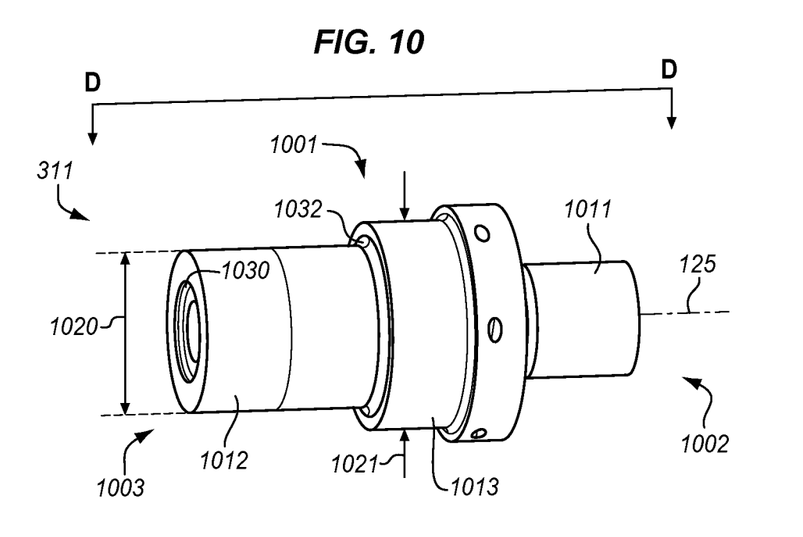
FIG. 10 is a perspective view of a hose adapter in an illustrative embodiment.
Figure 11:
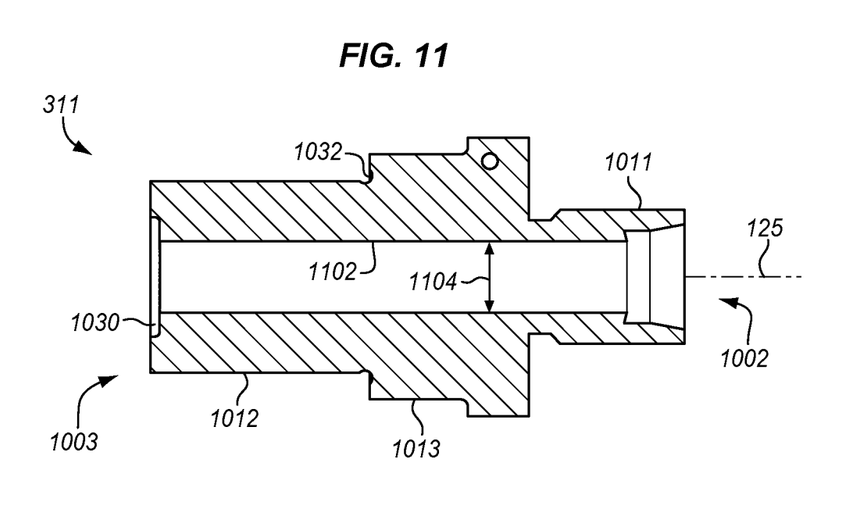
FIG. 11 is a cross-sectional view of a hose adapter in an illustrative embodiment.

FIG. 10 is a perspective view of hose adapter 311, and FIG. 11 is a cross-sectional view of hose adapter 311 in an illustrative embodiment. The view in FIG. 11 is across cut-line D-D in FIG. 10. Hose adapter 311 generally has a cylindrical body 1001 that includes a hose fitting 1011 at one end 1002, a cylindrical member 1012 at the other end 1003, and an inlet port coupling 1013 between hose fitting 1011 and cylindrical member 1012. Hose fitting 1011 is configured to connect to a hose pipe or the like, such as in a hydraulic circuit, a pneumatic circuit, etc. Cylindrical member 1012 has an outer diameter 1020 that corresponds with (e.g., slightly less) the diameter 715 of bore segment 711 within inlet casing 104 so that cylindrical member 1012 fits within bore segment 711 (see also, FIG. 7). Inlet port coupling 1013 has a larger diameter 1021 than cylindrical member 1012, and is configured to couple with inlet port 111. For example, inlet port coupling 1013 may be pressed into inlet port 111, may be threaded into inlet port 111, may be fastened to inlet port 111, etc. In FIG. 11, hose adapter 311 includes a longitudinal bore 1102 centered on axial line 125. Longitudinal bore 1102 forms a fluid path between hose fitting 1011 and cylindrical member 1012, and has a diameter 1104. The diameter 1104 of longitudinal bore 1102 may be substantially similar to the diameter 714 of bore segment 710 of inlet casing 104 (see also, FIG. 7). Hose adapter 311 further includes a seal groove 1030 at end 1003, which is an annular groove around longitudinal bore 1102 that is configured to receive an annular seal member (not shown). Hose adapter 311 further includes a seal groove 1032 between cylindrical member 1012 and inlet port coupling 1013, which is an annular groove configured to receive an annular seal member (not shown).

Figure 12:
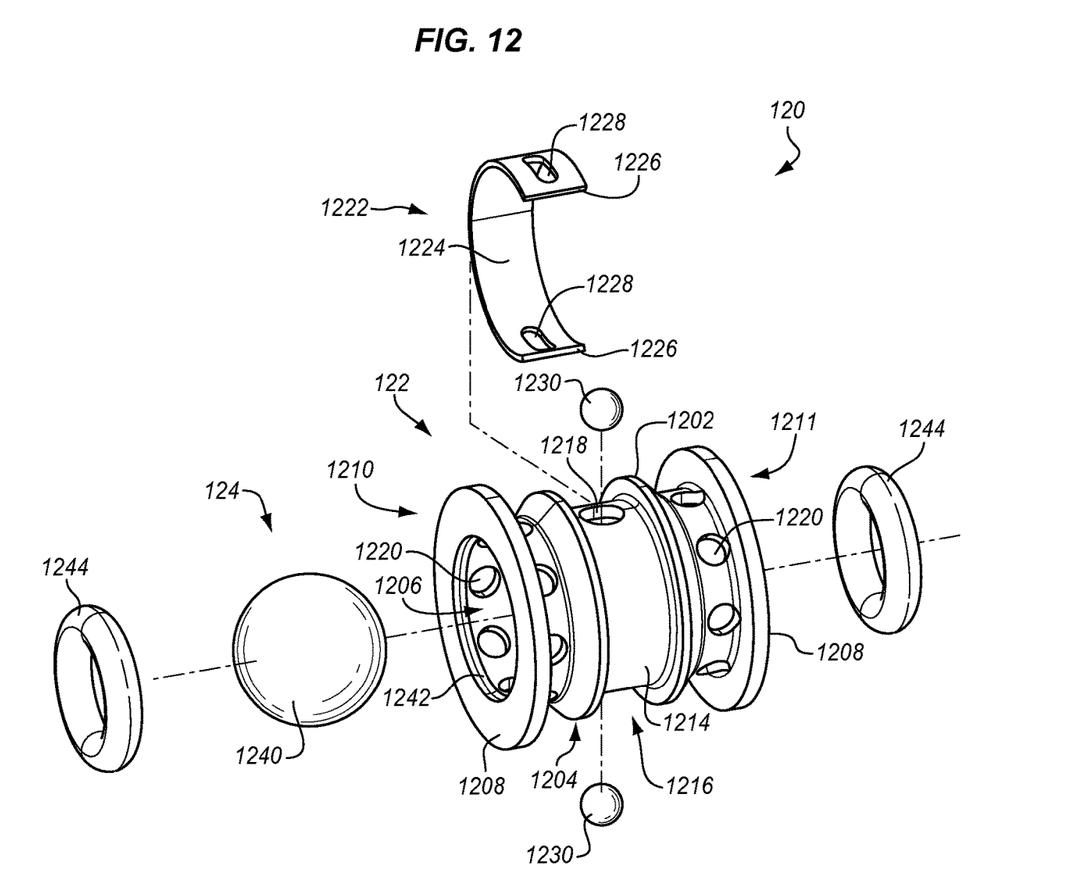
FIG. 12 is an exploded, perspective view of a shuttle cartridge in an illustrative embodiment.

FIG. 12 is an exploded, perspective view of shuttle cartridge 120 in an illustrative embodiment. Shuttle cartridge 120 is an assembly that includes sleeve 122 and spool 124. Sleeve 122 includes a cylindrical body 1202 having an outer peripheral surface 1204, and a spool bore 1206 disposed longitudinally. Spool bore 1206 may be generally smooth so that spool 124 is slidable within spool bore 1206. Sleeve 122 has flanges 1208 on outer peripheral surface 1204 at opposing ends 1210-1211 of cylindrical body 1202. Sleeve 122 further has a spring retainer groove 1214 on outer peripheral surface 1204 toward a middle region 1216 of cylindrical body 1202. Spring retainer groove 1214 includes ball apertures 1218, which are holes through cylindrical body 1202 from outer peripheral surface 1204 to spool bore 1206. Cylindrical body 1202 is perforated with fluid apertures 1220 between spring retainer groove 1214 and each of flanges 1208. Fluid apertures 1220 are holes through cylindrical body 1202 from outer peripheral surface 1204 to spool bore 1206.

In this embodiment, spool 124 may comprise a spherical ball 1240. Also, sleeve 122 may include a seal groove 1242 at each end 1210-1211, and a seal member 1244 may be fitted or inserted in seal grooves 1242. Seal member 1244 is an annular or ring-shaped seal, such as an O-ring. Seal members 1244 form spool seats for spherical ball 1240. For example, a seal member 1244 fitted in a seal groove 1242 at end 1210 may form a spool seat 128 as shown in FIG. 1, and a seal member 1244 fitted in a seal groove 1242 at end 1211 may form a spool seat 129. When spherical ball 1240 abuts a seal member 1244 at an end 1210-1211 of sleeve 122, spherical ball 1240 will block a flow of fluid into spool bore 1206 of sleeve 122 at that end 1210-1211.

Further in this embodiment, detent mechanism 130 of shuttle valve 100 is provided with a spring 1222 having a C-shaped body 1224 with open ends 1226, and detent balls 1230. Spring 1222 is made from a semi-flexible material, such as metal, so that ends 1226 are able to elastically deflect, expand, or deform radially outward in response to pressure applied to spool 124 along axial line 125. Spring 1222 has ball retaining holes 1228 toward the ends 1226 that are configured to hold or secure detent balls 1230. When assembled, detent balls 1230 are disposed between ball retaining holes 1228 of spring 1222, and ball apertures 1218 of spring retainer groove 1214. Detent balls 1230 extend partially into spool bore 1206 of sleeve 122, and prevent spool 124 from freely sliding within spool bore 1206. When a high enough pressure is applied to spool 124, spring 1222 expands and detent balls 1230 move radially outward from spool bore 1206 so that spool 124 may slide within spool bore 1206. Thus, spool 124 may shuttle between two operating positions.

Figure 13:
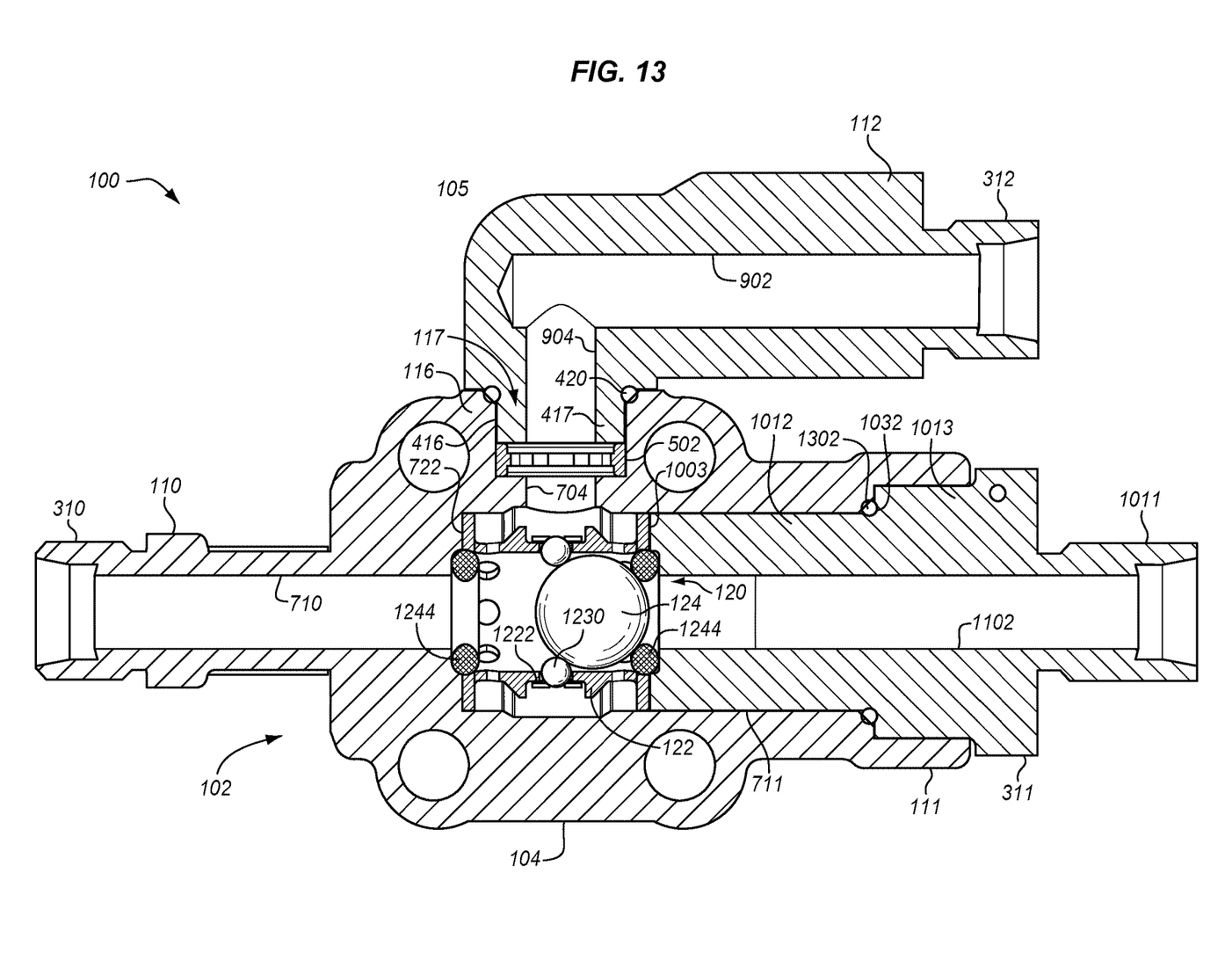
FIG. 13 is a cross-sectional view of a shuttle valve in an illustrative embodiment.

FIG. 13 is a cross-sectional view of shuttle valve 100 in an illustrative embodiment. The view in FIG. 13 is across cut-line A-A in FIG. 3. To assemble outlet casing 105 to inlet casing 104, outlet casing coupling port 117 is connected to inlet casing coupling port 116. More particularly, cylindrical member 417 of outlet casing coupling port 117 is inserted or fitted in cylindrical recess 416 of inlet casing coupling port 116. This provides fluid communication between outlet casing 105 and inlet casing 104. Seal member 420 may be installed or disposed in seal groove 802 of cylindrical member 417 (see FIG. 8) to provide a seal between outlet casing coupling port 117 and inlet casing coupling port 116.

Also shown in FIG. 13 is that strainer 502 may be installed in the fluid path between outlet casing 105 and inlet casing 104. Strainer 502 is disposed in cylindrical recess 416 of inlet casing 104, and cylindrical member 417 of outlet casing 105 abuts strainer 502 when fitted in cylindrical recess 416.

Shuttle cartridge 120 is inserted within bore segment 711 of inlet casing 104. As described above, shuttle cartridge 120 includes sleeve 122, and spool 124 that is slidable within sleeve 122. Hose adapter 311 is inserted or attached to inlet port 111 so that cylindrical member 1012 of hose adapter 311 fits within bore segment 711 of inlet casing 104. A seal member 1302 may be installed in seal groove 1032 of hose adapter 311 to provide a seal between hose adapter 311 and inlet port 111. When assembled, sleeve 122 is interposed between interface surface 722 of inlet casing 104, and end 1003 of hose adapter 311.

In operation, spool 124 is able to move between two operating positions. When inlet pressure (i.e., fluid pressure) at inlet port 110 is higher than inlet pressure at inlet port 111 by a threshold (e.g., 80-130 psi), the force from the fluid causes spring 1222 to radially expand and spool 124 is moved to the right as shown in FIG. 13 to seat against seal member 1244. This blocks inlet port 111 and allows fluid to flow from inlet port 110 to outlet port 112. When inlet pressure at inlet port 111 is higher than inlet pressure at inlet port 110 by a threshold, the force from the fluid causes spring 1222 to radially expand and spool 124 is moved to the left (not shown) to seat against seal member 1244. This blocks inlet port 110 and allows fluid to flow from inlet port 111 to outlet port 112.

Figure 14:
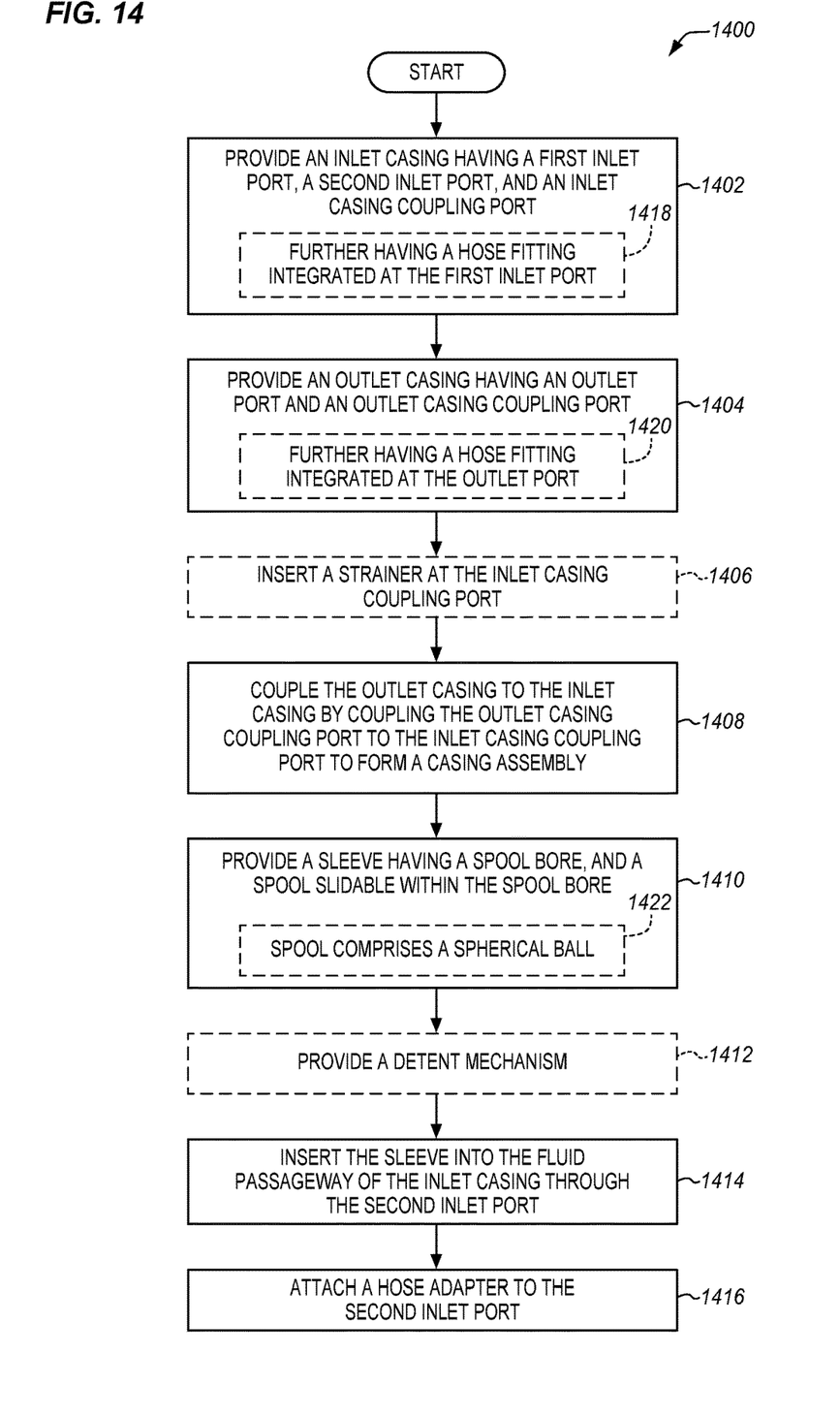
FIG. 14 is a flow chart illustrating a method of fabricating a shuttle valve in an illustrative embodiment.

FIG. 14 is a flow chart illustrating a method 1400 of fabricating a shuttle valve in an illustrative embodiment. The steps of method 1400 will be described with respect to shuttle valve 100 in the above figures, although one skilled in the art will understand that the methods described herein may be performed to fabricate other shuttle valves. The steps of the methods described herein are not all inclusive and may include other steps not shown. The steps for the flow charts shown herein may also be performed in an alternative order.

To begin, an inlet casing 104 is provided or obtained having inlet ports 110-111 that are coaxial, an inlet casing coupling port 116, and an inlet fluid passageway 114 providing fluid communication between inlet ports 110-111 and inlet casing coupling port 116 (step 1402). An outlet casing 105 is provided or obtained having an outlet port 112, an outlet casing coupling port 117, and an outlet fluid passageway 115 providing fluid communication between outlet port 112 and outlet casing coupling port 117 (step 1404). Outlet casing 105 is connected or attached to inlet casing 104 by coupling, connecting, or attaching outlet casing coupling port 117 of outlet casing 105 to inlet casing coupling port 116 of inlet casing 104 to form casing assembly 102 (step 1408). When assembled, outlet casing 105 is fluidly coupled to inlet casing 104 so that fluid is allowed to flow from inlet port 110 to outlet port 112, or from inlet port 111 to outlet port 112. In one embodiment, before attaching inlet casing 104 to outlet casing 105, a strainer 502 may be provided or inserted at inlet casing coupling port 116 of inlet casing 104 (optional step 1406) to remove foreign debris from the fluid.

In one embodiment, hose fittings may be integrated into inlet port 110 and outlet port 112. Thus, inlet casing 104 may be further provided or obtained having a hose fitting 310 integrated at inlet port 110 (optional step 1418). Also, outlet casing 105 may be further provided or obtained having a hose fitting 312 integrated at outlet port 112 (optional step 1420).

A sleeve 122 is provided or obtained having a spool bore 1206, and a spool 124 slidable within spool bore 1206 (step 1410). In one embodiment, sleeve 122 may be provided or obtained with the spool 124 comprising a spherical ball 1240 that is slidable within spool bore 1206 (optional step 1422).

Sleeve 122 is inserted into the inlet fluid passageway 114 of inlet casing 104 through inlet port 111 (step 1414). More particularly, sleeve 122 is inserted in a longitudinal bore 702 of inlet casing 104 through inlet port 111. A hose adapter 311 is attached or connected to inlet port 111 (step 1416). Thus, sleeve 122 is disposed between an interface surface 722 of inlet casing 104, and hose adapter 311. Method 1400 may include additional steps than described above, such as providing a detent mechanism 130 that holds spool 124 at a first operating position 151 that blocks inlet port 111, and a second operating position 152 that blocks inlet port 110 (optional step 1412).

Figure 15:
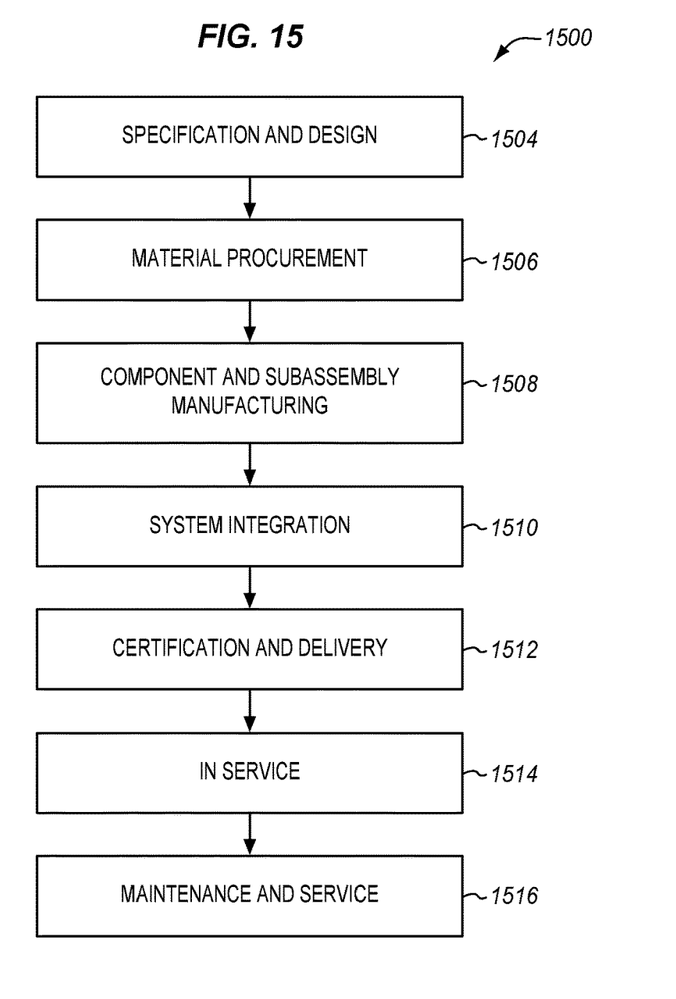
FIG. 15 is a flow chart illustrating an aircraft manufacturing and service method in an illustrative embodiment.
Figure 16:
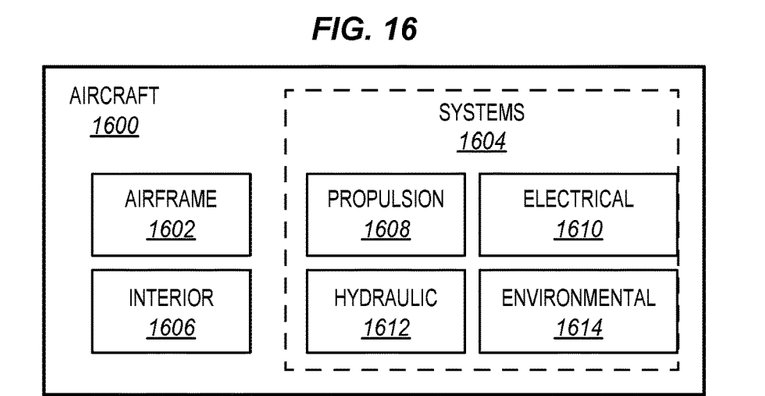
FIG. 16 is a schematic diagram of an aircraft in an illustrative embodiment.

The embodiments of the disclosure may be described in the context of an aircraft manufacturing and service method 1500 as shown in FIG. 15 and an aircraft 1600 as shown in FIG. 16. During pre-production, exemplary method 1500 may include specification and design 1504 of aircraft 1600, and material procurement 1506. During production, component and subassembly manufacturing 1508 and system integration 1510 of aircraft 1600 takes place. Thereafter, aircraft 1600 may go through certification and delivery 1512 in order to be placed in service 1514. While in service by a customer, aircraft 1600 is scheduled for routine maintenance and service 1516 (which may also include modification, reconfiguration, refurbishment, and so on).

Each of the processes of method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, aircraft 1600 produced by exemplary method 1500 may include an airframe 1602 with a plurality of systems 1604 and an interior 1606. Examples of high-level systems 1604 include one or more of a propulsion system 1608, an electrical system 1610, a hydraulic system 1612, and an environmental system 1614. Any number of other systems may be included. Although an aerospace example is shown, the principles described in this specification may be applied to other industries, such as the automotive industry.

Apparatus and methods embodied herein may be employed during any one or more of the stages of the production and service method 1500. For example, components or subassemblies corresponding to production process 1508 may be fabricated or manufactured in a manner similar to components or subassemblies produced while aircraft 1600 is in service. Also, one or more apparatus embodiments, method embodiments, or a combination thereof may be utilized during the production stages 1508 and 1510, for example, by substantially expediting assembly of or reducing the cost of aircraft 1600. Similarly, one or more of apparatus embodiments, method embodiments, or a combination thereof may be utilized while aircraft 1600 is in service, for example and without limitation, to maintenance and service 1516.

Although specific embodiments were described herein, the scope is not limited to those specific embodiments. Rather, the scope is defined by the following claims and any equivalents thereof.

The invention claimed is:
1. A shuttle valve, comprising:
a casing assembly that includes:

an inlet casing having a first inlet port, a second inlet port coaxial with the first inlet port, an inlet casing coupling port, and an inlet fluid passageway providing fluid communication between the first inlet port, the second inlet port, and the inlet casing coupling port; and an outlet casing having an outlet port, an outlet casing coupling port, and an outlet fluid passageway providing fluid communication between the outlet port and the outlet casing coupling port;

wherein the outlet casing coupling port is removably coupled to the inlet casing coupling port;

a sleeve disposed in the inlet fluid passageway; and a spool;

wherein the sleeve includes:

a cylindrical body having an outer peripheral surface, and a spool bore disposed longitudinally within which the spool is slidable;

flanges on the outer peripheral surface at opposing ends of the cylindrical body; and a spring retainer groove on the outer peripheral surface at a middle region of the cylindrical body;

wherein the cylindrical body is perforated with fluid apertures between the spring retainer groove and each of the flanges.

2. The shuttle valve of claim 1 further comprising:

a strainer;

wherein the inlet casing coupling port includes a cylindrical recess, and the strainer is disposed in the cylindrical recess;

wherein the outlet casing coupling port includes a cylindrical member fitted in the cylindrical recess to abut the strainer; and wherein the cylindrical member includes a seal groove, and a seal member is disposed in the seal groove to provide a seal between the outlet casing coupling port and the inlet casing coupling port.

3. The shuttle valve of claim 1 wherein:

the inlet casing includes a longitudinal bore centered on an axial line, and having a first bore segment of a first diameter, and a second bore segment of a second diameter that is larger than the first diameter;

a transition portion between the first bore segment and the second bore segment forms an interface surface; and the first bore segment is disposed between the first inlet port and the interface surface, and the second bore segment is disposed between the second inlet port and the interface surface.

4. The shuttle valve of claim 3 further comprising:

a hose adapter having:

a hose fitting at a first end;

a cylindrical member at a second end that fits within the second bore segment of the inlet casing;

an inlet port coupling between the hose fitting and the cylindrical member that couples with the second inlet port; and a longitudinal bore centered on the axial line.

5. The shuttle valve of claim 4 wherein:

the sleeve is interposed between the interface surface of the inlet casing and the second end of the hose adapter.

6. The shuttle valve of claim 1 wherein:

the inlet casing includes a hose fitting formed unitarily with the inlet casing at the first inlet port; and the outlet casing includes a hose fitting formed unitarily with the outlet casing at the outlet port.

7. The shuttle valve of claim 1 wherein:

the spring retainer groove includes ball apertures; and the shuttle valve further comprises a detent mechanism that includes:

a spring having a C-shaped body with open ends, and further having ball retaining holes toward the ends; and detent balls disposed between the ball retaining holes of the spring and the ball apertures of the spring retainer groove.

8. The shuttle valve of claim 7 wherein:

the spool comprises a spherical ball.

9. The shuttle valve of claim 8 wherein:

the sleeve further includes:

a seal groove disposed around the spool bore at each of the ends of the cylindrical body; and a seal member fitted in the seal groove.

10. An aircraft comprising:

the shuttle valve of claim 1.

11. A shuttle valve, comprising:

an inlet casing and an outlet casing assembled to form a casing assembly;

wherein the inlet casing includes a first inlet port, a second inlet port coaxial with the first inlet port, an inlet casing coupling port, and a longitudinal bore that defines an inlet fluid passageway providing fluid communication between the first inlet port, the second inlet port, and the inlet casing coupling port;

wherein the longitudinal bore of the inlet casing has a first bore segment of a first diameter, a second bore segment of a second diameter that is larger than the first diameter, and a transition portion between the first bore segment and the second bore segment forms an interface surface that faces the second inlet port;

wherein a first hose fitting is formed unitarily with the inlet casing at the first inlet port;

wherein the outlet casing includes an outlet port, an outlet casing coupling port, and an outlet fluid passageway providing fluid communication between the outlet port and the outlet casing coupling port;

wherein the outlet casing coupling port is coupled to the inlet casing coupling port to form the casing assembly;

wherein the shuttle valve further comprises a removable shuttle cartridge that includes:

a sleeve disposed in the longitudinal bore of the inlet casing;

a first spool seat at a first end of the sleeve;

a second spool seat at a second end of the sleeve; and a spool slidable within a spool bore of the sleeve between a first operating position where the spool is seated against the second spool seat to block the second inlet port, and a second operating position where the spool is seated against the first spool seat to block the first inlet port;

wherein the shuttle valve further comprises a hose adapter that includes a second hose fitting, and is coupled to the second inlet port of the inlet casing with the sleeve interposed between the interface surface of the inlet casing and the hose adapter.

12. The shuttle valve of claim 11 wherein:

the spool comprises a spherical ball slidable within the spool bore.

13. The shuttle valve of claim 11 wherein:

the longitudinal bore of the inlet casing is centered on a first axial line;

the inlet casing further includes a transverse bore centered on a second axial line transverse to the first axial line that intersects the longitudinal bore of the inlet casing;

the outlet casing includes a longitudinal bore centered on a third axial line parallel to the first axial line, and a transverse bore centered on the second axial line transverse to the third axial line.

14. The shuttle valve of claim 11 wherein:

the hose adapter includes:
- the second hose fitting at a first end;
- a cylindrical member at a second end that fits within the longitudinal bore of the inlet casing;
- an inlet port coupling between the second hose fitting and the cylindrical member that couples with the second inlet port; and
- a longitudinal bore coaxial with the longitudinal bore of the inlet casing.

15. The shuttle valve of claim 11 wherein:

the sleeve comprises a cylindrical body having a first seal groove disposed around the spool bore at the first end of the sleeve, and a second seal groove disposed around the spool bore at the first end of the sleeve;

a first seal member is fitted in the first seal groove to form the first seal seat; and a second seal member is fitted in the second seal groove to form the second seal seat.

16. The shuttle valve of claim 11 wherein the sleeve comprises:
- a hollow, cylindrical body having an outer peripheral surface;
- flanges on the outer peripheral surface at opposing ends of the cylindrical body; and
- a spring retainer groove on the outer peripheral surface at a middle region of the cylindrical body;
- wherein the cylindrical body is perforated with fluid apertures between the spring retainer groove and each of the flanges.

17. The shuttle valve of claim 16 wherein:

the spring retainer groove includes ball apertures; and the shuttle valve further comprises a detent mechanism that includes:
- a spring having a C-shaped body with open ends, and further having ball retaining holes toward the ends; and
- detent balls disposed between the ball retaining holes of the spring and the ball apertures of the spring retainer groove.

18. A method of fabricating a shuttle valve, the method comprising:

providing an inlet casing having a first inlet port, a second inlet port coaxial with the first inlet port, an inlet casing coupling port, and a longitudinal bore that defines an inlet fluid passageway providing fluid communication between the first inlet port, the second inlet port, and the inlet casing coupling port, wherein a first hose fitting is formed unitarily with the inlet casing at the first inlet port, and the longitudinal bore of the inlet casing has a first bore segment of a first diameter, a second bore segment of a second diameter that is larger than the first diameter, and a transition portion between the first bore segment and the second bore segment forms an interface surface that faces the second inlet port;

providing an outlet casing having an outlet port, an outlet casing coupling port, and an outlet fluid passageway providing fluid communication between the outlet port and the outlet casing coupling port;

coupling the outlet casing coupling port of the outlet casing to the inlet casing coupling port of the inlet casing to form a casing assembly;

providing a removable shuttle cartridge that includes a sleeve having a spool bore, a first spool seat at a first end of the sleeve, a second spool seat at a second end of the sleeve, and a spool slidable within the spool bore between a first operating position where the spool is seated against the second spool seat to block the second inlet port, and a second operating position where the spool is seated against the first spool seat to block the first inlet port;

inserting the sleeve through the second inlet port and into a longitudinal bore of the inlet casing that defines the inlet fluid passageway; and attaching a hose adapter to the second inlet port of the inlet casing with the sleeve interposed between an interface surface of the inlet casing and the hose adapter, wherein the hose adapter includes a second hose fitting.

19. The method of claim 18 further comprising:

inserting a strainer at the inlet casing coupling port of the inlet casing.

20. The method of claim 18 wherein providing the removable shuttle cartridge comprises:

providing the removable shuttle cartridge that includes a spherical ball slidable within the spool bore.

\* \* \* \* \*